(12) United States Patent
Yeh

(10) Patent No.: US 10,169,224 B2
(45) Date of Patent: Jan. 1, 2019

(54) DATA PROTECTING METHOD FOR PREVENTING RECEIVED DATA FROM LOSING, MEMORY STORAGE APPARATUS AND MEMORY CONTROL CIRCUIT UNIT

(71) Applicant: PHISON ELECTRONICS CORP., Miaoli (TW)

(72) Inventor: Chih-Kang Yeh, Kinmen County (TW)

(73) Assignee: PHISON ELECTRONICS CORP., Miaoli (TW)

( * ) Notice: Subject to any disclaimer, the term of this patent is extended or adjusted under 35 U.S.C. 154(b) by 179 days.

(21) Appl. No.: 14/243,903

(22) Filed: Apr. 3, 2014

(65) Prior Publication Data
US 2015/0205715 A1  Jul. 23, 2015

(30) Foreign Application Priority Data
Jan. 22, 2014 (TW) .............................. 103102280 A

(51) Int. Cl.
*G06F 12/02* (2006.01)
(52) U.S. Cl.
CPC .. *G06F 12/0246* (2013.01); *G06F 2212/7203* (2013.01); *G06F 2212/7205* (2013.01)
(58) Field of Classification Search
CPC .............................. G06F 12/0246; G06F 3/06
See application file for complete search history.

(56) References Cited

U.S. PATENT DOCUMENTS

| 8,566,505 B2 * | 10/2013 | Kilzer | G06F 12/0246 711/100 |
| 2008/0034174 A1 * | 2/2008 | Traister | G06F 12/0246 711/159 |
| 2013/0151762 A1 * | 6/2013 | Koseki | G06F 3/061 711/103 |

FOREIGN PATENT DOCUMENTS

TW   201403316   1/2014

OTHER PUBLICATIONS

Junghee, Lee; Kim, Youngjae; Galen, Shipman M., Oral, Sarp; Kim, Jongman, Premptible I/O Scheduling of Garbage Collection for SOlid STate Drives, Feb. 2013, IEEE Transactions on Computer-Aided Design of Integrated Circuits and Systems, vol. 32, No. 2 ( Year: 2013).*
"Office Action of Taiwan Counterpart Application", dated Jul. 7, 2015, p. 1-p. 6.

* cited by examiner

*Primary Examiner* — Reginald G Bragdon
*Assistant Examiner* — Edward Wang
(74) *Attorney, Agent, or Firm* — JCIPRNET

(57) ABSTRACT

A data protecting method, a memory storage apparatus and a memory control circuit unit are provided. The method includes: determining whether a first procedure being executed or about to be executed by the memory storage device is a first type procedure; and if the first procedure being executed or about to be executed by the memory storage device is the first type procedure, temporarily stopping receiving a first data corresponding to a first write command before the first procedure is finished.

25 Claims, 6 Drawing Sheets

DATA PROTECTING METHOD FOR PREVENTING RECEIVED DATA FROM LOSING, MEMORY STORAGE APPARATUS AND MEMORY CONTROL CIRCUIT UNIT

CROSS-REFERENCE TO RELATED APPLICATION

This application claims the priority benefit of Taiwan application serial no. 103102280, filed on Jan. 22, 2014. The entirety of the above-mentioned patent application is hereby incorporated by reference herein and made a part of this specification.

BACKGROUND

Technical Field

The invention is related to a data protecting method, and more particularly, to a data protecting method and a memory storage apparatus and a memory control circuit unit using the same.

Description of Related Art

The rapid growth in the popularity of digital cameras, cellular phones, and MP3 players in recent years has brought about the escalated demand for storage media by consumers. Since a rewritable non-volatile memory module (e.g., a flash memory) has several characteristics such as non-volatility of data, low power consumption, small size and non-mechanical structure, the rewritable non-volatile memory module is the most suitable memory module to be adopted in a portable multimedia device mentioned above. When a procedure which requires long executing time is performed by the rewritable non-volatile memory module and a data from the host system is received by the memory controller at the same time, the data may be stored in the buffer of the memory controller temporarily to waiting for handling. Later, after the procedure is finished, the data stored in the buffer would be handled (e.g., be transmitted to the rewritable non-volatile memory module).

However, if a power supply problem such as power failure occurs during the process of executing the procedure, because the process may not be finished yet during the supply time of backup power, the data stored in the buffer may probably be lost.

Nothing herein should be construed as an admission of knowledge in the prior art of any portion of the present invention. Furthermore, citation or identification of any document in this application is not an admission that such document is available as prior art to the present invention, or that any reference forms a part of the common general knowledge in the art.

SUMMARY

The invention provides a data protecting method, memory storage apparatus and memory control circuit unit for effectively preventing the received data from losing in the processing of waiting.

A data protecting method for a memory storage apparatus is provided according to an exemplary embodiment of the invention, which includes: determining whether a first procedure which is about to be executed or being executed by the memory storage apparatus is a first type procedure; and if the first procedure which is about to be executed or being executed by the memory storage apparatus is the first type procedure, temporarily stopping receiving a first data corresponding to a first write command before the first procedure is finished.

A memory storage apparatus is provided according to an exemplary embodiment of the invention. The memory storage apparatus includes a connection interface unit, a rewritable non-volatile memory module and a memory control circuit unit. The connection interface unit is coupled to a host system. The memory control circuit unit is coupled to the connection interface unit and the rewritable non-volatile memory module, and is configured to perform the following operations: determining whether a first procedure which is about to be executed or being executed by the memory control circuit unit is a first type procedure; and if the first procedure which is about to be executed or being executed by the memory control circuit unit is the first type procedure, temporarily stopping receiving a first data corresponding to a first write command from the host system before the first procedure is finished.

A memory control circuit unit for controlling a rewritable non-volatile memory module is provided according to an exemplary embodiment of the invention. The memory control circuit unit includes a host interface, a memory interface and a memory management circuit. The host interface is coupled to a host system. The memory interface is coupled to the rewritable non-volatile memory module. The memory management circuit is coupled to the host interface and the memory interface, wherein the memory management circuit is configured to perform the following operations: determining whether a first procedure which is about to be executed or being executed by the memory management circuit is a first type procedure; and if the first procedure which is about to be executed or being executed by the memory management circuit is the first type procedure, temporarily stopping receiving a first data corresponding to a first write command from the host system before the first procedure is finished.

Based on above, the data protecting method, the memory storage apparatus and memory control circuit unit of the invention is capable of determining whether a first procedure which is about to be executed or being executed by the memory storage apparatus is the first type procedure. Then, if it is determined that the first procedure is the first type procedure, a first data corresponding to a first write command would not be received before the first procedure is finished, so as to prevent the received data from losing during the process of waiting for handling To make the above features and advantages of the disclosure more comprehensible, several embodiments accompanied with drawings are described in detail as follows.

It should be understood, however, that this Summary may not contain all of the aspects and embodiments of the present invention, is not meant to be limiting or restrictive in any manner, and that the invention as disclosed herein is and will be understood by those of ordinary skill in the art to encompass obvious improvements and modifications thereto.

BRIEF DESCRIPTION OF THE DRAWINGS

The accompanying drawings are included to provide a further understanding of the invention, and are incorporated in and constitute a part of this specification. The drawings illustrate embodiments of the invention and, together with the description, serve to explain the principles of the invention.

DESCRIPTION OF THE EMBODIMENTS

Figure 1:
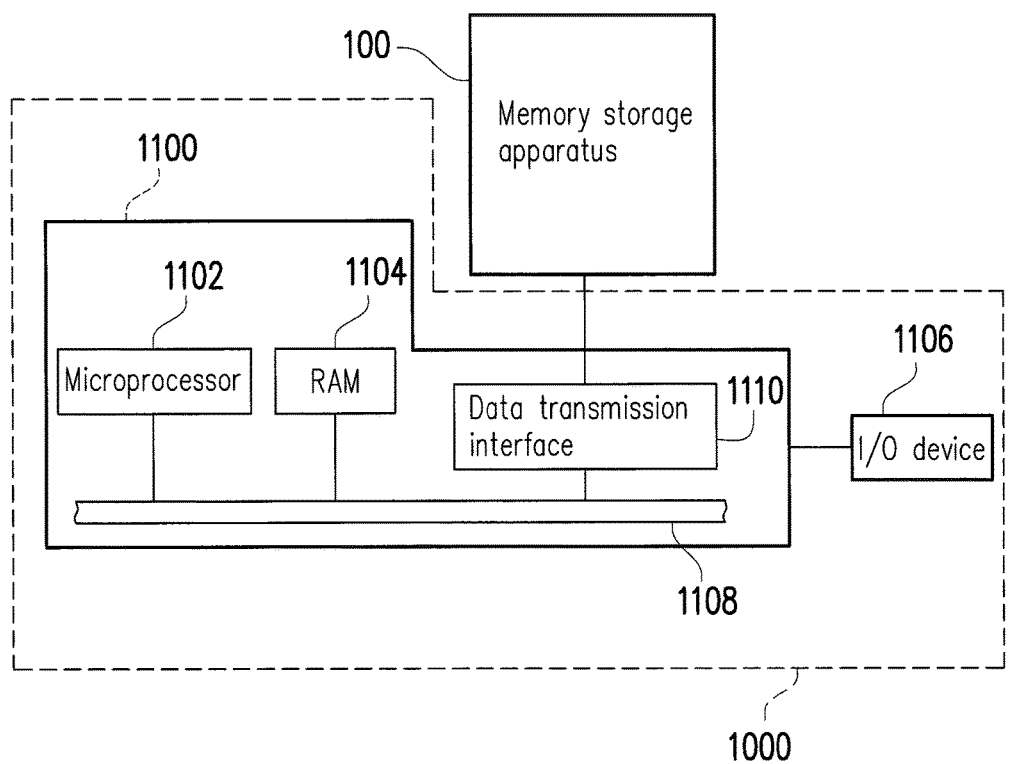
FIG. 1 illustrates a host system and a memory storage apparatus according to an exemplary embodiment of the invention.

Reference will now be made in detail to the present preferred embodiments of the invention, examples of which are illustrated in the accompanying drawings. Wherever possible, the same reference numbers are used in the drawings and the description to refer to the same or like parts.

Embodiments of the present invention may comprise any one or more of the novel features described herein, including in the Detailed Description, and/or shown in the drawings. As used herein, "at least one", "one or more", and "and/or" are open-ended expressions that are both conjunctive and disjunctive in operation. For example, each of the expressions "at least on of A,B and C", "at least one of A, B, or C", "one or more of A, B, and C", "one or more of A, B, or C" and "A, B, and/or C" means A alone, B alone, C alone, A and B together, A and C together, B and C together, or A, B and C together.

It is to be noted that the term "a" or "an" entity refers to one or more of that entity. As such, the terms "a" (or "an"), "one or more" and "at least one" can be used interchangeably herein.

Generally, a memory storage apparatus (e.g., a memory storage system) includes a rewritable non-volatile memory module and a controller (e.g., a control circuit). The memory storage apparatus is usually used together with a host system, such that the host system can write data into or read data from the memory storage apparatus.

FIG. 1 illustrates a host system and a memory storage apparatus according to an exemplary embodiment of the invention.

Figure 2:
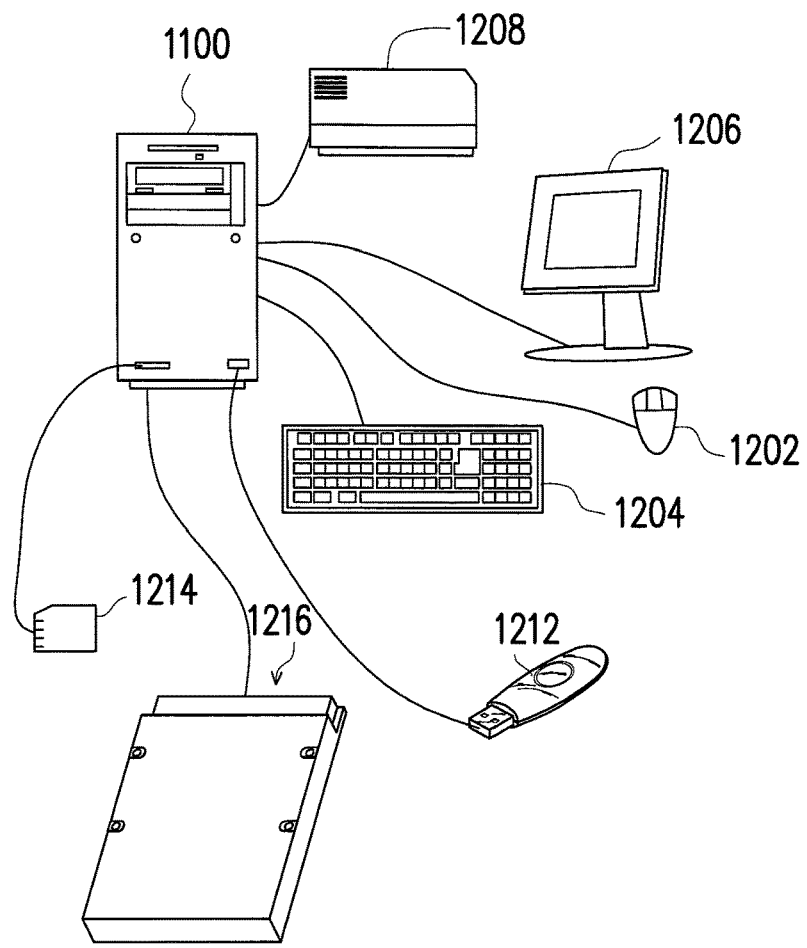
FIG. 2 is a schematic diagram illustrating a computer, an input/output (I/O) device, and a memory storage apparatus according to an exemplary embodiment of the invention.

With reference to FIG. 1, a host system 1000 generally includes a computer 1100 and an input/output (I/O) device 1106. The computer 1100 includes a microprocessor 1102, a random access memory (RAM) 1104, a system bus 1108 and a data transmission interface 1110. The I/O device 1106 includes a mouse 1202, a keyboard 1204, a display 1206, and a printer 1208 as shown in FIG. 2. It should be noted that the device illustrated in FIG. 2 constructs no limitation to the I/O device 1106, and the I/O device 1106 may further include other devices.

In the exemplary embodiment of the invention, the memory storage device 100 is coupled to the other devices of the host system 1000 through the data transmission interface 1110. By operating the microprocessor 1102, the RAM 1104 and the I/O device 1106, data can be written into the memory storage device 100 or can be read from the memory storage device 100. For example, the memory storage device 100 may be a rewritable non-volatile memory storage device, such as a flash drive 1212, a memory card 1214, or a solid state drive (SSD) 1216 shown in FIG. 2.

Figure 3:
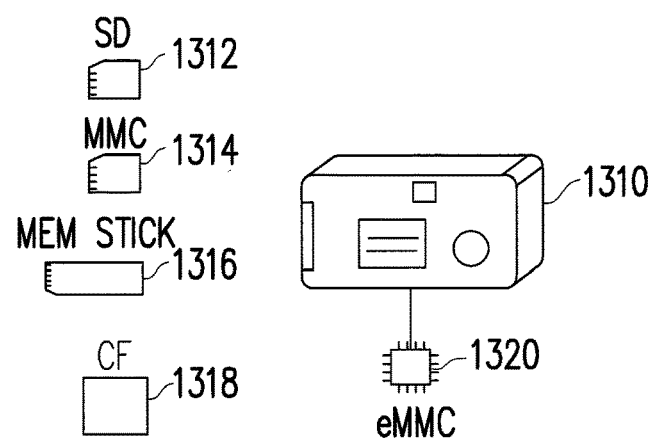
FIG. 3 is a schematic diagram illustrating a host system and a memory storage apparatus according to an exemplary embodiment of the invention.

Generally, the host system 1000 accompanied with the memory storage device 100 can substantially be any system capable of storing data. Even though the host system 1000 is described as a computer system in the exemplary embodiment, in another exemplary embodiment of the invention, the host system 1000 may also be a system such as a digital camera, a video camera, a communication device, an audio player, or a video player. For example, if the host system is a digital camera (video camera) 1310, the rewritable non-volatile memory storage device is then an SD card 1312, an MMC card 1314, a memory stick 1316, a CF card 1318 or an embedded storage device 1320 (as shown in FIG. 3). The embedded storage device 1320 includes an embedded MMC (eMMC). It should be noted that the eMMC is directly coupled to the substrate of the host system.

Figure 4:
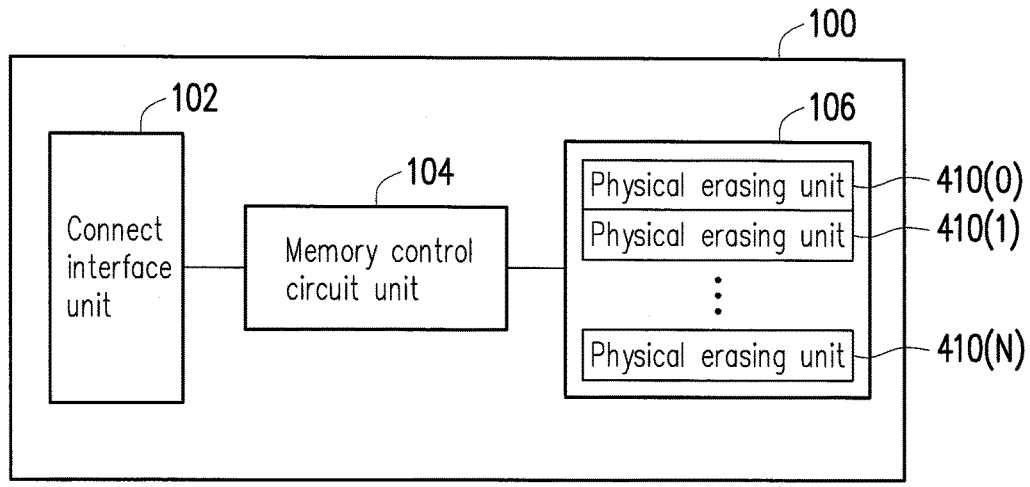
FIG. 4 is a schematic block diagram of the memory storage apparatus depicted in FIG. 1.

FIG. 4 is a schematic block diagram of the memory storage device illustrated in FIG. 1.

With reference to FIG. 4, the memory storage device 100 includes a connection interface unit 102, a memory control circuit unit 104, and a rewritable non-volatile memory module 106.

In the present exemplary embodiment, the connection interface unit 102 complies with a serial advanced technology attachment (SATA) standard. However, it should be understood that the invention is not limited thereto, and the connection interface unit 102 may also comply with a parallel advanced technology attachment (PATA) standard, an institute of electrical and electronic engineers (IEEE) 1394 standard, a peripheral component interconnect express (PCI Express) standard, a universal serial bus (USB) standard, an ultra high speed-I (UHS-I) interface standard, an ultra high speed-ii (UHS-II) interface standard, a secure digital (SD) interface standard, a memory stick (MS) interface standard, a multi-media-card (MMC) interface standard, a compact flash (CF) interface standard, an integrated device electronics (IDE) interface standard or other suitable types of standards. In the present exemplary embodiment, the connection interface unit 102 may be packaged with the memory control circuit unit 104 in a chip or disposed outside a chip containing the memory control circuit unit 104.

The memory control circuit unit 104 is configured to execute a plurality of logical gates or control commands implemented in a hardware form or a firmware form and performs operations such as data writing, reading, and erasing in the rewritable non-volatile memory module 106 according to commands from the host system 1000.

The rewritable non-volatile memory module 106 is coupled to the memory control circuit unit 104 and is configured to store the data written by the host system 1000.

Figure 5:
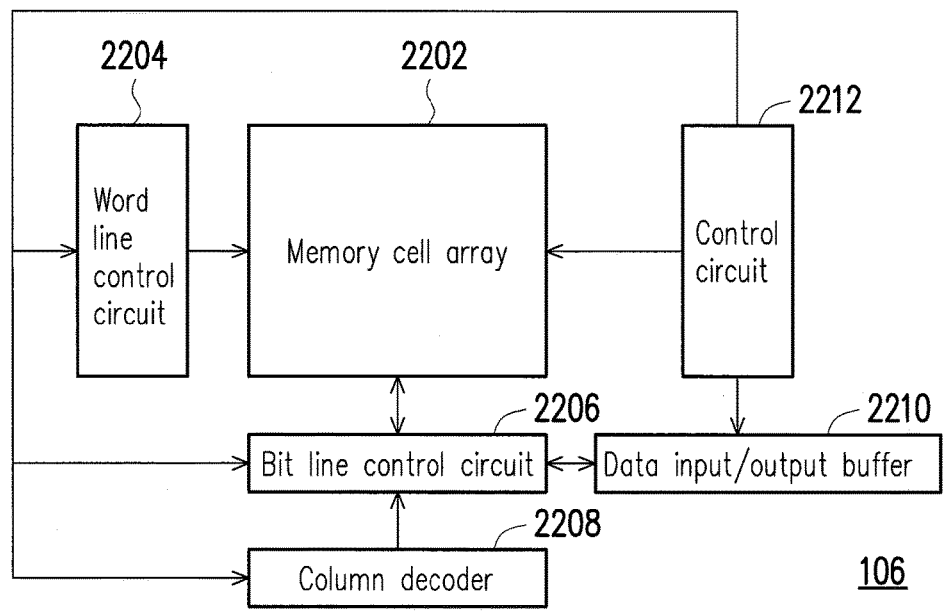
FIG. 5 is a schematic block diagram of a rewritable non-volatile memory module according to an exemplary embodiment of the invention.

FIG. 5 is a schematic block diagram of a rewritable non-volatile memory module according to an exemplary embodiment of the invention.

Please refer to FIG. 5, the rewritable non-volatile memory module 106 includes a memory cell array 2202, a word line control circuit 2204, a bit line control circuit 2206, a column decoder 2208, a data input/output (I/O) buffer 2210, and a control circuit 2212.

The memory cell array 2202 includes a plurality of memory cells used for storing data. The memory cells are disposed on the cross points of several bit lines and several word lines as an array. When receiving a write command or a read command from the memory control circuit unit 104, the control circuit 2212 may control the word line control circuit 2204, the bit line control circuit 2206, the column decoder 2208, the data input/output (I/O) buffer 2210 to write the data to the memory cell array 2202 or read the data from the memory cell array 2202. Otherwise, the word line control circuit 2204 is configured to control the voltage applied to the word lines, the bit line control circuit 2206 is configured to control the voltage applied to the bit lines, the column decoder 2208 choose the corresponding bit line according to the decoding raw address of the command, and the data input/output buffer 2210 is configured to temporarily store the data.

The memory cells of the memory cell array 2202 are grouped to physical erasing units 410(0) to 410(N). For example, the physical erasing units 410(0) to 410(N) may belong to the same memory die or different memory dies. Each physical erasing unit has a plurality of physical programming units, and the physical programming units that belong to the same physical erasing unit may be written independently and be erased simultaneously. In the present exemplary embodiment, each physical erasing unit consists of 64 physical programming units. However, in other exemplary embodiments of the invention, each physical erasing unit may consist of 128, 256 or any other number of physical programming units.

To be more detailed, one physical erasing unit is the smallest erasing unit. Namely, each physical erasing unit contains the least number of memory cells that are erased together. One physical programming unit is the smallest programming unit. Namely, each physical programming unit is the smallest unit for writing data. Each physical programming unit commonly includes a data bit area and a redundant bit area. The data bit area includes a plurality of physical access addresses for storing user data, and the redundant bit area is used for storing system data (e.g., control information and error correcting codes). In the present exemplary embodiment, the data bit area of each physical programming unit includes 4 physical access addresses, and the size of each of the physical access addresses is 512 bytes. However, in other exemplary embodiments, the data bit area may also include a greater or smaller number of physical access addresses, and the invention is not intent to limit the size and the number of the physical access addresses. For example, in an exemplary embodiment, the physical erasing units may refer to physical blocks, and the physical programming units may refer to physical pages or physical sectors, but the invention is not limited thereto.

In the present exemplary embodiment, the rewritable non-volatile memory module 106 is a multi-level cell (MLC) NAND flash memory module (e.g., a flash memory module capable of storing data of at least 2 bits in one memory cell). However, the invention is not limited thereto, and the rewritable non-volatile memory module 106 may also be a single-level cell (SLC) NAND flash memory module (e.g., a flash memory module capable of storing data of 1 bit in one memory cell), a trinary-level cell (TLC) NAND flash memory module (e.g., a flash memory module capable of storing data of 3 bits in one memory cell), any other flash memory module, or any other memory module with the same characteristics.

Figure 6:
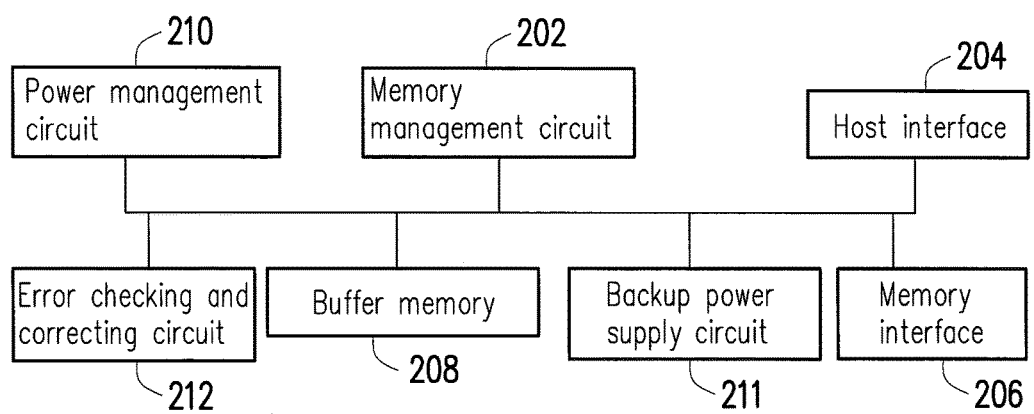
FIG. 6 is a schematic block diagram illustrating a memory control circuit unit according to an exemplary embodiment of the invention.

FIG. 6 is a schematic block diagram illustrating a memory control circuit unit according to an exemplary embodiment of the invention.

Referring to the FIG. 6, the memory control circuit unit 104 includes a memory management circuit 202, a host interface 204, a memory interface 206, a buffer memory 208, a power management circuit 210 and a backup power supply circuit 211.

The memory management circuit 202 is configured to control the overall operation of the memory control circuit unit 104. Particularly, the memory management circuit 202 has a plurality of control instructions, and when the memory storage device 100 is in operation, the control instructions are executed to perform data writing, reading, and erasing operations.

In the present exemplary embodiment, the control instructions of the memory management circuit 202 are implemented in a firmware form. For instance, the memory management circuit 202 has a microprocessor unit (not shown) and a read-only memory (ROM, not shown), and these control instructions are burnt into the ROM. When the memory storage device 100 is in operation, the control instructions are executed by the microprocessor unit to perform operations, such as data writing, data reading and data erasing.

In another exemplary embodiment of the invention, the control instructions of the memory management circuit 202 are stored in a specific area of the rewritable non-volatile memory module 106 (for instance, a system area of the memory module exclusively used for storing system data) as program codes. Additionally, the memory management circuit 202 has a microprocessor unit (not shown), a ROM (not shown), and a random access memory (RAM). In particular, the ROM has boot codes, and when the memory control circuit unit 104 is enabled, the microprocessor unit first executes the boot codes to load the control instructions from the rewritable non-volatile memory module 106 into the RAM of the memory management circuit 202. The microprocessor unit then runs the control instructions to write, read, and erase data.

Moreover, in another exemplary embodiment, the control instructions of the memory management circuit 202 may also be implemented in a hardware form. For example, the memory management circuit 202 includes a microcontroller, a memory cell management circuit, a memory writing circuit, a memory reading circuit, a memory erasing circuit and a data processing circuit. The memory cell management circuit, the memory writing circuit, the memory reading circuit, the memory erasing circuit and the data processing circuit are coupled to the microcontroller. The memory cell management circuit is configured to manage physical erasing units of the rewritable non-volatile memory module 106, the memory writing circuit configured to issue a writing command to the rewritable non-volatile memory module 106 to write data thereto, the memory reading circuit is configured to issue a reading instruction to the rewritable non-volatile memory module 106 to read data therefrom, the memory erasing circuit is configured to issue an erasing instruction to the rewritable non-volatile memory module 106 to erase data therefrom, and the data processing circuit is configured to process data to be written to the rewritable non-volatile memory module 106 or data read from the rewritable non-volatile memory module 106. The description with respect to the memory management circuit 202 below may be directly or indirectly applied to the memory control circuit unit 104.

The memory management circuit 202 configures a plurality of logical addresses for data access to the physical erasing units stored with the data in the aforementioned alternating manner. For instance, when the memory storage device 100 is formatted by a file system (e.g., FAT 32), the logical addresses are respectively mapped to at least parts of the physical erasing units 410(0) to 410(N). For example, the memory management circuit 202 may establish a logical address-physical erasing unit mapping table to record a mapping relation between the logic addresses and the physical erasing units. In the present exemplary embodiment, the size of each of the logical addresses is equal to the size of each of the physical erasing units 410(0) to 410(N), and the logical address be referred to as a logical block address (LBA). Additionally, in another exemplary embodiment, the size of each of the logical addresses may also be the size of one physical programming unit or any other size, which does not construe any limitation to the invention.

The host interface 204 is coupled to the memory management circuit 202 and configured to receive and identify commands and data transmitted by the host system 1000. Namely, the commands and data from the host system 1000 are transmitted to the memory management circuit 202 through the host interface 204. In the present exemplary embodiment, the host interface 204 complies with the SATA standard. However, it should be understood that the invention is not limited thereto, and the host interface 204 may comply with the PATA standard, the IEEE 1394 standard, the PCI Express standard, the USB standard, the UHS-I interface standard, the UHS-II interface standard, the SD standard, the MS standard, the MMC standard, the CF standard, the IDE standard, or other suitable data transmission standard.

The memory interface 206 is coupled to the memory management circuit 202 and configured to access the rewritable non-volatile memory module 106. Namely, data to be written into the rewritable non-volatile memory module 106 may be converted by the memory interface 206 into a format acceptable to the rewritable non-volatile memory module 106.

The buffer memory 208 is coupled to the memory management circuit 202 and configured to temporarily store the data and commands from the host system 1000 or the data from the rewritable non-volatile memory module 106. For example, the buffer memory 208 may include the dynamic random access memory (DRAM) and the static random access memory (SRAM), and any kind of the memory that will lose stored data because of the power failure or the unstable power supply. Otherwise, the buffer memory 208 is implemented in a form of the chipset or the System on Chip (SoC) in the memory control circuit unit 104, or independent outside of the memory control circuit unit 104, the invention is not limited hereto.

The power management circuit 210 is coupled to the memory management circuit 202 and configured to control the power of the memory storage apparatus 100.

The backup power supply circuit 211 is coupled to the power management circuit 210. In the exemplary embodiment, the backup power supply circuit 211 includes at least one capacitor. In the normal time, the backup power supply circuit 211 stores a specific amount or level of the power energy. When a power supply problem such as power failure or voltage supplying unstable occurs, the backup power supply circuit 211 provides backup power to the memory storage apparatus 100. The more power energy the backup power supply circuit 211 stored in normal time (e.g., the backup power supply circuit 211 has more capacitors or the size of each capacitor in the backup power supply circuit 211 is bigger), the supply time of the backup power is longer when occurring power failure. In the opposite, the less power energy the backup power supply circuit 211 stored in the normal time (e.g., the backup power supply circuit 211 has less capacitors or the size of each capacitor in the backup power supply circuit 211 is smaller), the supply time of the backup power is shorter when occurring power failure. However, in another exemplary embodiment, the backup power supply circuit 211 is disposed outside of the memory control circuit unit 104, the invention is not limited hereto.

In an exemplary embodiment, the memory control circuit unit 104 also includes an error checking and correcting circuit(ECC) 212.

The ECC circuit 212 is coupled to the memory management circuit 202 and configured to perform an ECC procedure to ensure data accuracy. To be specific, when the memory management circuit 202 receives a writing command from the host system 1000, the ECC circuit 212 generates an ECC code for data corresponding to the writing command, and the memory management circuit 202 writes the data and the corresponding ECC code into the rewritable non-volatile memory module 106. Thereafter, when reading the data from the rewritable non-volatile memory module 106, the memory management circuit 202 simultaneously reads the ECC code corresponding to the data, and the ECC circuit 212 performs the ECC procedure on the read data according to the corresponding ECC code.

Figure 7:
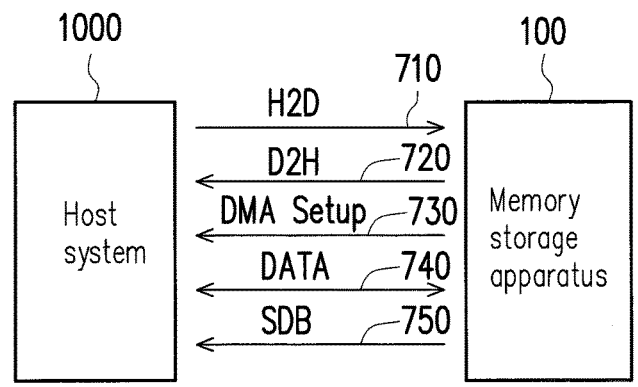
FIG. 7 is a schematic diagram illustrating a transmission between a host system and a memory storage apparatus according to an exemplary embodiment of the invention.

FIG. 7 is a schematic diagram illustrating a transmission between a host system and a memory storage apparatus according to an exemplary embodiment of the invention.

Please refer to FIG. 7, it takes the SATA standard for example here, the host system 1000 and the memory storage apparatus 100 may exchange several frame information structure (FIS) to finish an execution of a command. It should be noted, in the SATA standard, the FISs belong to the transport layer, so that one FIS is also included in other kinds of data structures, those skilled in the art may understand how to transfer the FISs, and the detail will be omitted here. Otherwise, the host system 1000 and the memory storage apparatus 100 may also exchange other signals, and the invention is not limited hereto. When the host system 1000 issues a command to the memory storage apparatus 100, the host system 1000 may transfer a host to device (H2D) FIS 710 to the memory storage apparatus 100 first. The FIS 710 is used for indicating the information of the command. Then, the memory storage apparatus 100 may transfer a device to host (D2H) FIS 720 to the host system 1000. After exchanging the FISs 710 and 720, it means that the command already transferred to the memory storage apparatus 100, and the command may be stored in the command series of the memory storage apparatus 100.

When the memory storage apparatus 100 executes a command of the command series, the memory storage apparatus 100 may send a direct memory access setup (DMA setup) FIS 730 to the host system 1000. The command about to be executed may be the write command, the read command, the executing command of the garbage collection procedure of the rewritable non-volatile memory module 106, the executing command of updating procedure of the logical address-physical erasing unit mapping table, the executing command of the wear-leveling procedure or the executing command of failure handling procedure corresponding to any command(e.g., write command or read command), and so on. Moreover, the commands stored in the command series may be executed by the memory management circuit 202 or the control circuit 2212, the invention is not limited hereto.

Then, the host system 1000 may transfer DATA FIS 740 to the memory storage apparatus 100 (e.g., the command issued is a write command). Otherwise, the memory storage apparatus 100 may transfer data FIS 740 to the host system 1000 (e.g., the command issued is a read command) When the command is finished, the memory storage apparatus 100 may send the set device bits (SDB) FIS 750 to the host system 1000. After receiving the FIS 750, the host system 1000 may issue another command to the memory storage apparatus 100.

In the exemplary embodiment, the memory management circuit 202 may determine whether a procedure (refer to the first procedure hereinafter) which is about to be executed or being executed by the memory storage apparatus 100 is a first type procedure.

In the exemplary embodiment, the first type procedure includes a logical address-physical erasing unit mapping table updating procedure, a wear-leveling procedure, a failure handling procedure, and any procedure which has a very long executing time and cannot be interrupted during the execution or may cause the data losing because of the interruption. The logical address-physical erasing unit mapping table updating procedure refers to that the memory management circuit 202 updates the relation, stored in the logical address-physical erasing unit mapping table of the rewritable non-volatile memory module 106, between the logical addresses and the physical erasing units of the rewritable non-volatile memory module 106. The wear-leveling procedure refers to that the memory management circuit 202 executes the wear-leveling of each memory cell of the rewritable non-volatile memory module 106. The failure handling procedure refers to that the recovery procedure executed by the memory management circuit 202 when it happens a serious data read error or a data write error (e.g., too many error bits to be corrected). Moreover, the first type procedure may also includes the garbage collection procedure of the rewritable non-volatile memory module 106 and any procedure which has a longer executing time but could be interrupted, the invention is not limited hereto.

In another exemplary embodiment, the memory management circuit 202 may obtain the total executing time of the first procedure. The total executing time of the first procedure refers to the time which is needed for the first procedure from the starting of the execution to the finishing of the execution. For example, the memory management circuit 202 may pre-record the total executing time of each kind of the procedures which the memory storage apparatus 100 may executed in a table, and then the memory management circuit 202 may obtain the total executing time of the first procedure by inquiring this table. Otherwise, the memory management circuit 202 may obtain the total executing time of the first procedure through the way of real-time simulation or by estimating, the invention is not limited hereto. The memory management circuit 202 may determine whether the total executing time of the first procedure is more than or equal to a threshold value. If the total executing time of the first procedure is more than or equal to the threshold value, the memory management circuit 202 determines that the first procedure is the first type procedure. In the opposite, if the total executing time of the first procedure is less than the threshold value, the memory management circuit 202 would not determine that the first procedure is the first type procedure.

It should be mentioned that, in an exemplary embodiment, the threshold value is determined by the memory management circuit 202 according to the supply time of the backup power of the memory storage apparatus 100, and the backup power is supplied by the backup power supply circuit 211. For example, the threshold value may be set to be less than or equal to the maximum available power supply time of the backup power which is supplied by the backup power supply circuit 211 (Namely, the supply time of the backup power, which is fully charged, of the backup power supply circuit 211). Or, the threshold value may be set adaptively to be less than or equal to the current supply time of the backup power of the backup power supply circuit 211. Moreover, the threshold value may be the system predetermined value or a value set by the user himself, the invention is not limited hereto.

If the memory management circuit 202 determines that the first procedure is the first type procedure, the memory management circuit 202 may temporarily stop receiving a data (refers to the first data hereinafter) corresponding to a write command (refers to the first write command hereinafter) from the host system 1000 before the first procedure is finished. In the opposite, if the memory management circuit 202 determines that the first procedure is not the first type procedure, the memory management circuit 202 is allowed to receive the first data corresponding to the first write command from the host system 1000 before the first procedure is finished.

It should be mentioned, in the exemplary embodiment, the memory management circuit 202 may continuously determine whether each procedure which is about to be executed or being executed by the memory storage apparatus 100 is a first type procedure. If the memory management circuit 202 determine that the first procedure which is about to be executed or being executed by the memory storage apparatus 100 is the first type procedure, the memory management circuit 202 will temporarily stop sending the FIS 720 first, no matter it received the first write command (or the FIS 710) from the host system 1000, so as to assure that the host system 1000 will not send the first data corresponding to the first write command before the first procedure is finished.

Moreover, in another exemplary embodiment, the memory management circuit 202 only performs the determination at some specific time points. For example, when the memory management circuit 202 receives the first write command (or, the FIS 710), the memory management circuit 202 may determine whether a first procedure which is about to be executed or being executed by the memory storage apparatus 100 exists according to the first write command. If the first procedure exists, the memory management circuit 202 may then determine whether the first procedure is the first type procedure. If the first procedure is the first type procedure, the memory management circuit 202 may temporarily stop receiving the first data from the host system 1000 before the first procedure is finished. For example, the FIS 720 would not be sent. Moreover, if the memory management circuit 202 determines that there is no first procedure which is about to be executed or being executed by the memory storage apparatus 100 (for example, the memory storage apparatus 100 is idle), or the first procedure is not the first type procedure (for example, the first procedure is the general read or write procedure), and then the memory management circuit 202 may receive the first data according to the first write command. For example, the memory management circuit 202 may send the FISs 720 and 730 to the host system 1000 first, and then receive the FIS 740 from the host system 1000.

Figure 8:
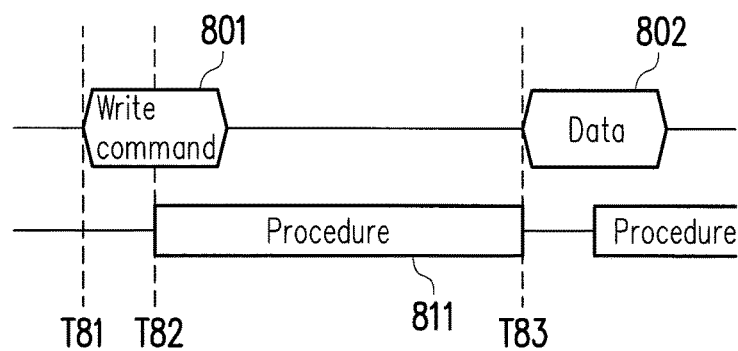
FIG. 8 is a diagram illustrating a timing order according to an exemplary embodiment of the invention.

FIG. 8 is a diagram illustrating a timing order according to an exemplary embodiment of the invention.

Please refer to FIG. 8, at the time point T81, the memory storage apparatus 100 receives the write command 801. The memory management circuit 202 may determine if there is a procedure, which is about to be executed or being executed by the memory storage apparatus 100, in the command series, according to the receiving time (Namely, the time point T81) of the write command 801. Assuming that the procedure 811 is about to be executed by the memory management circuit 202, memory management circuit 202 may determine whether the procedure 811 is the first type procedure. If the memory management circuit 202 determines that the procedure 811 is the first type procedure, then between the time points T82 and T83, the memory management circuit 202 may stop receiving the data 802 corresponding to the write command 801 from the host system 1000, wherein the time point T82 is the time point at which the procedure 811 is started to be executed, and the time point T83 is the time point at which the procedure 811 is finished. After the time point T83, the memory management circuit 202 is allowed to receive the data 802.

However, in another exemplary embodiment, before sending the FIS 750 to the host system 1000, if the memory management circuit 202 determines that the first procedure which is about to be executed or being executed by the memory storage apparatus 100 is the first type procedure, the memory management circuit 202 may temporarily stop sending the FIS 750 to the host system 1000, so as to stop the host system 1000 initialing a transmission of next command. And then, when the first procedure is finished, the memory management circuit 202 may recover the sending of the FIS 750.

In another exemplary embodiment, if the memory management circuit 202 determines that the first procedure which is about to be executed or being executed by the memory storage apparatus 100 is the first type procedure, the memory management circuit 202 may block or filter all the write command from the host system 1000 before the first procedure is finished. For example, the memory management circuit 202 may block or filter all the FIS 710 from the host system 1000. Accordingly, the FIS 710 will not be received by the memory management circuit 202 or the command in the FIS 710 will not be stored in the command series such that the memory management circuit 202 will not receive the following FIS 740.

In an exemplary embodiment, when the memory management circuit 202 receives the write command (refers to the second write command hereinafter) from the host system 1000 and the data (refers to the second data hereinafter) corresponding to the second write command, the memory management circuit 202 may temporarily store the second data to a buffer of the memory storage apparatus 100. The buffer, for example, is a part of or all of the buffer memory 208. In this exemplary embodiment, when the second data is written into the buffer and the buffer still has available space for temporarily storing the data (e.g., the entire foregoing first data) from the host system 1000, the memory management circuit 202 determines whether the first procedure which is about to be executed or being executed by the memory storage apparatus 100 is a first type procedure. If the memory management circuit 202 determines that the first procedure is the first type procedure, the memory management circuit 202 may further determine whether a procedure (refers to the second procedure hereinafter) corresponding to the second data, which is temporarily stored in the buffer, is finished. If the second procedure is finished, the memory management circuit 202 may allow the memory storage apparatus 100 to start to execute the first procedure. In the opposite, if the second procedure is not finished yet, the memory management circuit 202 will not allow the memory storage apparatus 100 starting to execute the first procedure.

Figure 9:
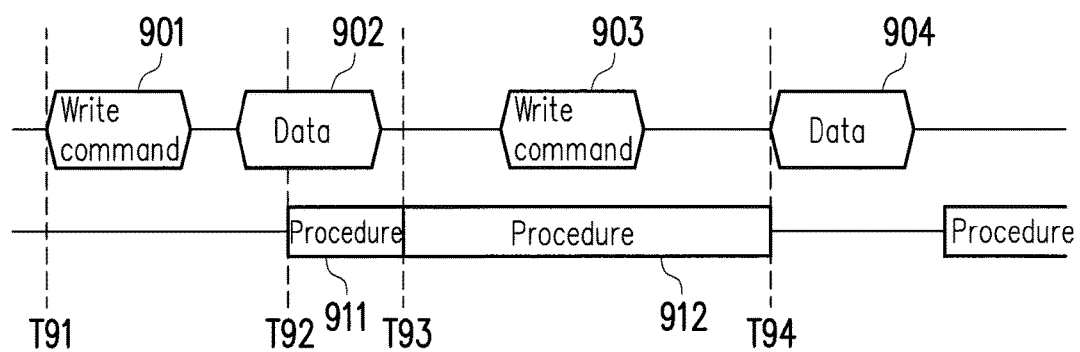
FIG. 9 is a diagram illustrating a timing order according to another exemplary embodiment of the invention.

FIG. 9 is a diagram illustrating a timing order according to another exemplary embodiment of the invention.

Please refers to the FIG. 9, at the time point T91, the memory management circuit 202 receives the write command 901 and then the memory management circuit 202 receives the data 902 corresponding to the write command 901. The memory management circuit 202 may temporarily store the write command 901 and the data 902 in the buffer memory 208. At the time point T92, the memory management circuit 202 starts to execute the procedure 911 which is corresponding to the data 902 temporarily stored in the buffer memory 208. For example, writing the data 902 into the rewritable non-volatile memory module 106. Before executing the procedure 911 or in the process of executing the procedure 911, if the memory management circuit 202 knows the procedure 912 is about to be executed, the memory management circuit 202 may determine whether the procedure 912 is the first type procedure. If the procedure 912 is not the first type procedure, the memory management circuit 202 may execute procedure 911 and procedure 912 according to the default executing sequence. For example, the memory management circuit 202 may execute the procedure 912 first and then execute the procedure 911. Or, the memory management circuit 202 may execute a part of the procedure 911 first and then execute the procedure 912, and continue the execution of the other part of the procedure 911 after finishing the procedure 912. However, if the memory management circuit 202 determines that the procedure 912 is the first type procedure, the memory management circuit 202 may assure that the procedure 911 will be finished before the starting of executing the procedure 912. And then, at the time point T93, the procedure 911 is finished such that the memory management circuit 202 may start to execute the procedure 912. At the time point T94, the procedure 912 is finished.

Between the time point T93 and the time point T94, it is assumed that the memory management circuit 202 receives a write command 903 from the host system 1000. When receiving the write command 903, even though the buffer memory 208 has enough space for temporarily storing the entire data 904 corresponding to the write command 903, the memory management circuit 202 may also postpone the time at which to start to receive the data 904 to the time point T94 or after the time point T94. For example, before the time point T94, the memory management circuit 202 may temporarily stop sending the FIS 720 to the host system 1000. And then, at the time point T94 or after the time point T94, the memory management circuit 202 may be allowed to send the FIS 720 to the host system 1000.

It should be mentioned, although the exemplary embodiments of FIG. 8 and FIG. 9 are taking the data transmission of the SATA interface of FIG. 7 for exemplary description, however, for various types of the memory interface, the transmission sequence, the number and the content of the FISs 710~750 may be also adaptively adjusted, and it is not limited hereto.

Figure 10:
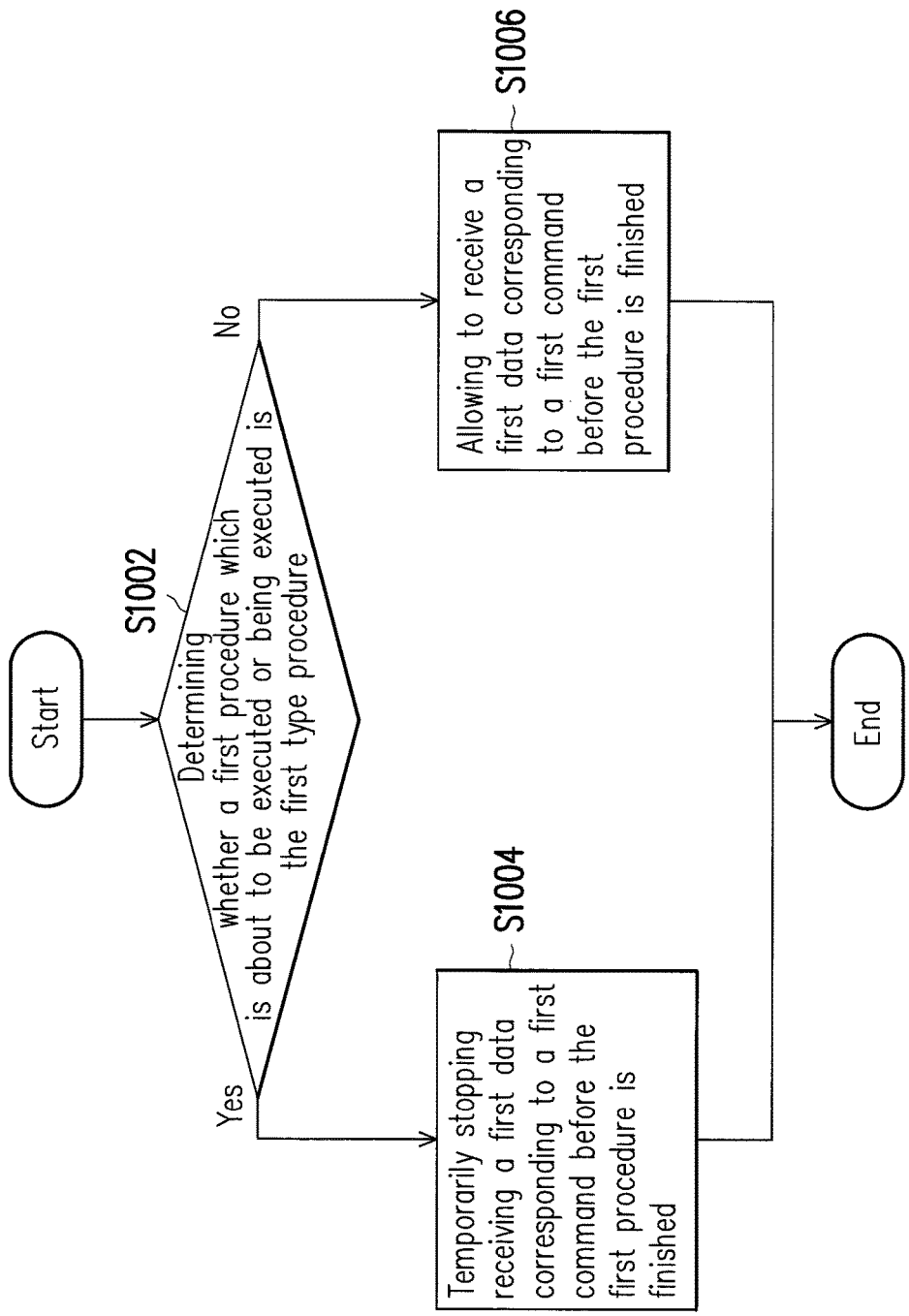
FIG. 10 is a flowchart illustrating the steps of the data protecting method according to an exemplary embodiment.

FIG. 10 is a flowchart illustrating the steps of the data protecting method according to an exemplary embodiment.

Please refers to the FIG. 10, in the step S1002, the memory management circuit 202 determine whether the first procedure which is about to be executed or being executed is the first type procedure.

If the first procedure which is about to be executed or being executed is the first type procedure, in the step S1004, the memory management circuit 202 temporarily stopping receiving a first data corresponding to a first write command before the first procedure is finished.

Moreover, if the first procedure which is about to be executed or being executed is not the first type procedure, in the step S1006, the memory management circuit 202 is allowed to receive a first data corresponding to a first write command before the first procedure is finished.

Nevertheless, steps depicted in FIG. 10 are described in detail as above, thus related description is omitted hereinafter. It should be noted that, the steps depicted in FIG. 10 may be implemented as a plurality of program codes or circuits, and the invention is not limited thereto. Moreover, the method disclosed in FIG. 10 may be implemented with reference to above embodiments, or may be implemented independently, the invention is not limited thereto.

It should be mentioned that even though the memory management circuit 202 is implemented in the memory control circuit unit 104, the invention is not limited thereto. In another exemplary embodiment, the memory management circuit 202 may also be implemented in the control circuit 2212 of the rewritable non-volatile memory module 106, and electrically connect to the memory cell array 2202 of the rewritable non-volatile memory module 106 through an interface.

Based on above, the data protecting method, the memory storage apparatus and memory control circuit unit of the invention may, continuously or at a specific time point, determine whether a first procedure which is about to be executed or being executed is a first type procedure, and temporarily stop receiving a first data corresponding to a first write command before the first procedure is finished if the first procedure is a first type procedure, so as to prevent the received data from losing in the processing of waiting.

The previously described exemplary embodiments of the present invention have the advantages aforementioned, wherein the advantages aforementioned not required in all versions of the invention.

It will be apparent to those skilled in the art that various modifications and variations can be made to the structure of the present disclosure without departing from the scope or spirit of the disclosure. In view of the foregoing, it is intended that the present disclosure cover modifications and variations of this disclosure provided they fall within the scope of the following claims and their equivalents.

What is claimed is:

1. A data protecting method for a memory storage apparatus, comprising:
   determining whether a first procedure which is about to be executed or being executed by the memory storage apparatus is a first type procedure according to a total executing time of the first procedure;
   if the first procedure which is about to be executed or being executed by the memory storage apparatus is the first type procedure, temporarily stopping receiving a first data corresponding to a first write command from a host system to all buffers of the memory storage apparatus before the execution of the first procedure is finished; and
   allowing the memory storage apparatus to receive the first data corresponding to the first write command only after the first procedure is finished.

2. The data protecting method of claim 1, further comprising:
   if the first procedure which is about to be executed or being executed by the memory storage apparatus is not the first type procedure, allowing the memory storage apparatus to receive the first data corresponding to the first write command and store the first data to a first buffer of the buffers of the memory storage apparatus temporarily.

3. The data protecting method of claim 1, wherein the step of that if the first procedure which is about to be executed or being executed by the memory storage apparatus is the first type procedure, temporarily stopping receiving the first data corresponding to the first write command before the first procedure is finished comprising:
   temporarily stopping receiving the write command and the first data corresponding to the write command.

4. The data protecting method of claim 1, wherein the step of that if the first procedure which is about to be executed or being executed by the memory storage apparatus is the first type procedure, temporarily stopping receiving the first data corresponding to the first write command before the first procedure is finished comprising:
   temporarily stopping sending a device to host frame information structure.

5. The data protecting method of claim 1, wherein the step of determining whether a first procedure which is about to be executed or being executed by the memory storage apparatus is the first type procedure comprising:
   receiving the first write command;
   determining whether the first procedure which is about to be executed or being executed by the memory storage apparatus exists;
   if the first procedure which is about to be executed or being executed by the memory storage apparatus does not exist, receiving the first data according to the first write command; and
   if the first procedure which is about to be executed or being executed by the memory storage apparatus exists, determining whether the first procedure is the first type procedure.

6. The data protecting method of claim 1, wherein the first buffer has a space for temporarily storing the entire first data.

7. The data protecting method of claim 6, wherein before the step of determining whether the first procedure which is about to be executed or being executed is the first type procedure, the data protecting method further comprising:
   receiving a second write command and a second data corresponding to the second write command, and temporarily storing the second data to the first buffer, wherein after the step of temporarily storing the second data to the first buffer, the first buffer still has the space for temporarily storing the entire first data,
   if the first procedure which is about to be executed or being executed by the memory storage apparatus is the first type procedure, the data protecting method further comprising:
   determining whether a second procedure corresponding to the second data which is temporarily stored in the first buffer is finished;
   if the second procedure is finished, allowing the memory storage apparatus to start to execute the first procedure; and
   if the second procedure is not finished, not allowing the memory storage apparatus to start to execute the first procedure.

8. The data protecting method of claim 1, wherein the step of determining whether the first procedure which is about to be executed or being executed by the memory storage apparatus is the first type procedure according to the total executing time of the first procedure comprising:
   obtaining the total executing time of the first procedure which is about to be executed or being executed by the memory storage apparatus;
   determining whether the total executing time is more than or equal to a threshold value; and
   if the total executing time is more than or equal to the threshold value, determining that the first procedure which is about to be executed or being executed by the memory storage apparatus is the first type procedure.

9. The data protecting method of claim 8, further comprising:
   determining the threshold value according to a supply time of a backup power of the memory storage apparatus.

10. The data protecting method of claim 1, wherein the first type procedure comprises a mapping table updating procedure, a wear-leveling procedure or a failure handling procedure.

11. A memory storage apparatus, comprising:
   a connection interface unit, coupled to a host system;
   a rewritable non-volatile memory module; and
   a memory control circuit unit, coupled to the connection interface unit and the rewritable non-volatile memory module, and is configured to perform the following operations:
   determining whether a first procedure which is about to be executed or being executed by the memory control circuit unit is a first type procedure according to a total executing time of the first procedure; and
   if the first procedure which is about to be executed or being executed by the memory control circuit unit is the first type procedure, temporarily stopping receiving a first data corresponding to a first write command from the host system to all buffers before the first procedure is finished, and allowing the memory storage apparatus to receive the first data corresponding to the first write command only after the execution of the first procedure is finished.

12. The memory storage apparatus of claim 11, wherein the operation of that if the first procedure which is about to be executed or being executed by the memory control circuit unit is the first type procedure, temporarily stopping receiving the first data corresponding to the first write command from the host system before the first procedure is finished comprising:
   temporarily stopping sending a device to host frame information structure.

13. The memory storage apparatus of claim 11, wherein the operation of determining whether the first procedure which is about to be executed or being executed by the memory control circuit unit is the first type procedure comprising:
   receiving the first write command;
   determining whether the first procedure which is about to be executed or being executed by the memory control circuit unit exists;
   if the first procedure which is about to be executed or being executed by the memory control circuit unit not exists, receiving the first data according to the first write command; and
   if the first procedure which is about to be executed or being executed by the memory control circuit unit exists, determining whether the first procedure which is about to be executed or being executed by the memory control circuit unit is the first type procedure.

14. The memory storage apparatus of claim 11, wherein a first buffer of the buffers has a space for temporarily storing the entire first data.

15. The memory storage apparatus of claim 14, wherein before the step of determining whether the first procedure which is about to be executed or being executed by the memory control circuit unit is the first type procedure, the memory control circuit unit is further configured to receive a second write command and a second data corresponding to the second write command, and temporarily store the second data to the first buffer, wherein after the second data being temporarily stored into the first buffer, the first buffer still has the space for temporarily storing the entire first data,
   if the first procedure which is about to be executed or being executed by the memory control circuit unit is the first type procedure, the memory control circuit unit is further configured to perform the following operations:
   determining whether a second procedure corresponding to the second data which is temporarily stored in the first buffer is finished;
   if the second procedure is finished, allowing the memory control circuit unit to start to execute the first procedure; and
   if the second procedure is not finished, not allowing the memory control circuit unit to start to execute the first procedure.

16. The memory storage apparatus of claim 11, wherein the operation of determining whether the first procedure which is about to be executed or being executed by the memory control circuit unit is the first type procedure according to the total executing time of the first procedure comprising:
   obtaining the total executing time of the first procedure which is about to be executed or being executed by the memory control circuit unit;
   determining whether the total executing time is more than or equal to a threshold value; and
   if the total executing time is more than or equal to the threshold value, determining that the first procedure which is about to be executed or being executed by the memory control circuit unit is the first type procedure.

17. The memory storage apparatus of claim 16, wherein the memory control circuit unit is further configured to perform the following operations:
   determining the threshold value according to a supply time of a backup power of the memory storage apparatus.

18. The memory storage apparatus of claim 11, wherein the first type procedures comprises a mapping table updating procedure, a wear-leveling procedure, or a failure handling procedure.

19. A memory control circuit unit for controlling a rewritable non-volatile memory module, comprising:
   a host interface, coupled to a host system;
   a memory interface, coupled to the rewritable non-volatile memory module; and
   a memory management circuit, coupled to the host interface and the memory interface, wherein the memory management circuit is configured to perform the following operations:
   determining whether a first procedure which is about to be executed by the memory management circuit is a first type procedure according to a total executing time of the first procedure; and
   if the first procedure which is about to be executed by the memory management circuit is the first type procedure, temporarily stopping receiving a first data corresponding to a first write command from the host system to all buffers before the first procedure is finished, and allowing the memory storage apparatus to receive the first data corresponding to the first write command only after the execution of the first procedure is finished.

20. The memory control circuit unit of claim 19, wherein the operation of that if the first procedure which is about to be executed by the memory management circuit is the first type procedure, temporarily stopping receiving the first data corresponding to the first write command from the host system before the first procedure is finished comprising:

temporarily stopping sending a device to host command to the host system.

21. The memory control circuit unit of claim 19, wherein a first buffer of the buffers has a space for temporarily storing the entire first data.

22. The memory control circuit unit of claim 21, wherein before the operation of determining whether the first procedure which is about to be executed by the memory management circuit is the first type procedure, the memory management circuit is further configured to receive a second write command and a second data corresponding to the second write command, and temporarily store the second data to the first buffer, wherein after the second data being temporarily stored to the first buffer, the first buffer still has the space for temporarily storing the entire first data, if the first procedure which is about to be executed by the memory management circuit is the first type procedure, the memory management circuit is further configured to perform the following operations:

determining whether a second procedure corresponding to the second data which is temporarily stored in the first buffer is finished;

if the second procedure is finished, allowing the memory management circuit to start to execute the first procedure; and if the second procedure is not finished, not allowing the memory management circuit to start to execute the first procedure.

23. The memory control circuit unit of claim 19, wherein the operation of determining whether the first procedure which is about to be executed by the memory management circuit is the first type procedure according to the total executing time of the first procedure comprising:

obtaining the total executing time of the first procedure which is about to be executed by the memory management circuit;

determining whether the total executing time is more than or equal to a threshold value; and if the total executing time is more than or equal to the threshold value, determining that the first procedure which is about to be executed by the memory management circuit is the first type procedure.

24. The memory control circuit unit of claim 23, wherein the memory management circuit is further configured to perform the following operation:

determining the threshold value according to a supply time of a backup power of the memory control circuit unit.

25. The memory control circuit unit of claim 19, wherein the first type procedures comprises a mapping table updating procedure, a wear-leveling procedure, or a failure handling procedure.

* * * * *